US012641497B2

(12) United States Patent
Liu

(10) Patent No.: US 12,641,497 B2
(45) Date of Patent: May 26, 2026

(54) SWITCHING METHOD AND DEVICE IN SIDELINK RELAY ARCHITECTURE

(71) Applicant: VIVO MOBILE COMMUNICATION CO., LTD., Dongguan (CN)

(72) Inventor: Jiamin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 545 days.

(21) Appl. No.: 17/946,015

(22) Filed: Sep. 15, 2022

(65) Prior Publication Data

US 2023/0014969 A1 Jan. 19, 2023

Related U.S. Application Data

(63) Continuation of application No. PCT/CN2021/082053, filed on Mar. 22, 2021.

(30) Foreign Application Priority Data

Mar. 25, 2020 (CN) ......................... 202010219518.X

(51) Int. Cl.
*H04W 36/00* (2009.01)
*H04W 92/18* (2009.01)

(52) U.S. Cl.
CPC ..... *H04W 36/0058* (2018.08); *H04W 36/033* (2023.05); *H04W 92/18* (2013.01)

(58) Field of Classification Search
CPC ............. H04W 36/0058; H04W 36/30; H04W 36/0088; H04W 36/0085; H04W 36/033; H04W 36/03; H04W 36/0055
See application file for complete search history.

(56) References Cited

U.S. PATENT DOCUMENTS

| | | | | |
|---|---|---|---|---|
| 2016/0157148 A1* | 6/2016 | Kato | ..................... | H04W 36/04 |
| | | | | 455/444 |
| 2017/0244468 A1* | 8/2017 | Zhao | ..................... | H04W 36/06 |
| 2018/0213577 A1 | 7/2018 | Burbidge et al. | | |
| 2019/0037463 A1 | 1/2019 | Feng | | |
| 2019/0141771 A1 | 5/2019 | Ma et al. | | |
| 2019/0150057 A1* | 5/2019 | Wang | ................... | H04W 36/16 |
| | | | | 370/311 |

(Continued)

FOREIGN PATENT DOCUMENTS

| | | |
|---|---|---|
| CN | 107211476 A | 9/2017 |
| CN | 107889080 A | 4/2018 |

(Continued)

OTHER PUBLICATIONS

Extended European Search Report issued in related European Application No. 21774472.1, mailed May 15, 2023, 13 pages.

(Continued)

*Primary Examiner* — Jeong S Park
(74) *Attorney, Agent, or Firm* — IPX PLLC

(57) ABSTRACT

A switching method and a device in a sidelink relay architecture are provided. The method is performed by a remote terminal and includes: receiving a first message from a network device, where the first message includes switching information; and performing, according to the switching information, switching from a source link to a target link, where at least one of the source link and the target link is a relay link.

16 Claims, 3 Drawing Sheets

100

Receive a first message from a network device, where the first message includes switching information

~S102

Perform switching from a source link to a target link according to the switching information, where at least one of the source link and the target link is a relay link

~S104

(56) References Cited

U.S. PATENT DOCUMENTS

| 2019/0174571 A1* | 6/2019 | Deenoo ............... H04W 76/27 |
| 2019/0320361 A1 | 10/2019 | Uchiyama et al. |
| 2019/0349822 A1* | 11/2019 | Kim .................... H04W 36/08 |
| 2020/0128470 A1* | 4/2020 | Mok .................... H04W 40/04 |
| 2020/0137638 A1* | 4/2020 | Kim ................. H04W 36/0011 |
| 2020/0288359 A1* | 9/2020 | Kim .................. H04W 36/026 |
| 2022/0104089 A1* | 3/2022 | Chang ............... H04W 36/185 |

FOREIGN PATENT DOCUMENTS

| CN | 109151928 A | 1/2019 |
| CN | 109328483 A | 2/2019 |
| EP | 2733988 A2 | 5/2014 |
| KR | 20180034524 A | 4/2018 |
| KR | 20180125455 A | 11/2018 |
| WO | 2017166115 A1 | 10/2017 |
| WO | 2018059126 A1 | 4/2018 |
| WO | 2018082644 A1 | 5/2018 |
| WO | 2021155526 A1 | 8/2021 |

OTHER PUBLICATIONS

MediaTek Inc., "Service Continuity for L2 Relay and L3 Relay", 3GPP TSG-RAN WG2 Meeting #112, R2-2009125, Nov. 2022, 12 pages.

First Office Action issued in related Chinese application No. 202010219518.X, mailed Jul. 22, 2022, 11 pages.

Second Office Action issued in related Chinese application No. 202010219518.X, mailed Jan. 30, 2023, 9 pages.

First Office Action issued in related Korean application No. 10-2022-7023360, mailed Mar. 8, 2024, 15 pages.

Nokia et al, "Path switch between direct and indirect communications", 3GPP TSG-RAN WG2 Meeting #98, R2-1704328, May 2017, 4 pages.

Ericsson, "Report of email discussion [104#57] [NR/V2X] Interface selection", 3GPP TSG-RAN WG2 Meeting #105, R2-1901705, Feb. 2019, 35 pages.

3rd Generation Partnership Project; Technical Specification Group Radio Access Network; NR; Radio Resource Control (RRC) protocol specification (Release 15) 3GPP TS 38.331.

3rd Generation Partnership Project; Technical Specification Group Radio Access Network; NR; Packet Data Convergence Protocol (PDCP) specification (Release 15), 3GPP TS 38.323 V15.6.0 (Jun. 2019), 26 pages.

Sequans Communications, "PDCP reestablishment / data recovery for UM bearer", 3GPP TSG-RAN WG2 NR AH#3; R2-1801247, Aug. 2018, 3 pages.

LG Electronics Inc., "Path switching and channel aspects for V2V", 3GPP TSG-RAN WG2 #93bis, R2-162946, Apr. 2016, 5 pages.

International Search Report issued in corresponding International Application No. PCT/CN2021/082053, mailed Jun. 7, 2021, 9 pages.

* cited by examiner

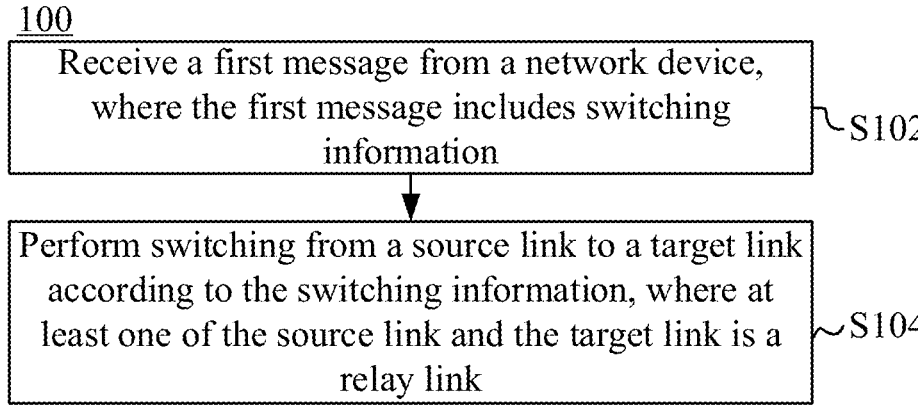

100

Receive a first message from a network device, where the first message includes switching information          ⌐S102

Perform switching from a source link to a target link according to the switching information, where at least one of the source link and the target link is a relay link          ⌐S104

Send a first message, where the first message includes switching information, and the switching information is used to indicate that a terminal device performs switching from a source link to a target link, where at least one of the source link and the target link is a relay link          ⌐S202

FIG. 2

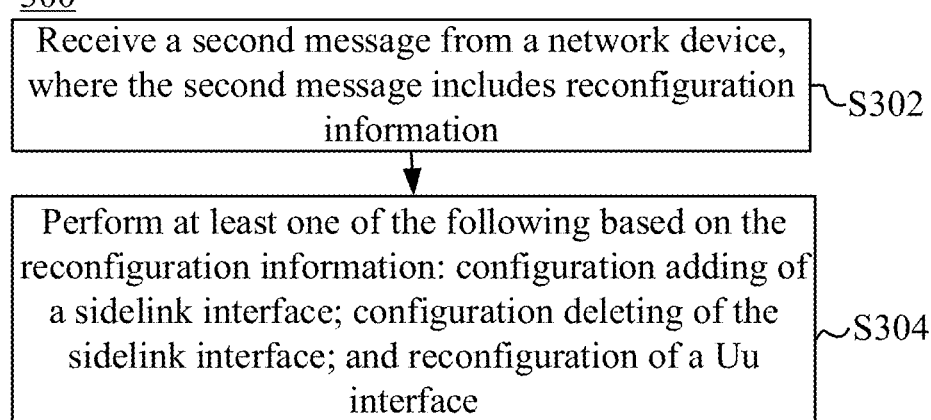

300

Receive a second message from a network device, where the second message includes reconfiguration information          ⌐S302

Perform at least one of the following based on the reconfiguration information: configuration adding of a sidelink interface; configuration deleting of the sidelink interface; and reconfiguration of a Uu interface          ⌐S304

FIG. 3

SWITCHING METHOD AND DEVICE IN SIDELINK RELAY ARCHITECTURE

CROSS-REFERENCE TO RELATED APPLICATIONS

This application is a continuation of International Application No. PCT/CN2021/082053, filed Mar. 22, 2021, which claims priority to Chinese Patent Application No. 202010219518.X, filed Mar. 25, 2020. The entire contents of each of the above-referenced applications are expressly incorporated herein by reference.

TECHNICAL FIELD

Embodiments of this application relate to the communications field, and in particular, to a switching method and device in a sidelink (lateral link, edge link, or the like) relay architecture.

BACKGROUND

A Long Term Evolution (LTE) system starts to support a sidelink from release 12, and the sidelink is used for direct data transmission between terminal devices without using a network device.

With the development of the sidelink, a sidelink relay scenario is proposed in the related art. In a typical sidelink relay scenario, a remote terminal device (remote UE, or remote terminal for short) forwards its data from a relay terminal (relay UE, or relay terminal for short) to a network device through a sidelink (or relay link) between the remote terminal and the relay terminal device. In this sidelink relay scenario, data transmission is performed between the remote terminal and the network device, and the relay terminal plays a role of data relay.

In the related art, the switching of the remote terminal in a sidelink relay architecture is not designed, and there is no related solution. A process of switching a Uu interface cannot be directly performed by a remote terminal, so that the remote terminal cannot perform normal switching, causing service interruption and reduced user experience.

SUMMARY

Embodiments of this application are intended to provide a switching method and device in a sidelink relay architecture.

According to a first aspect, a switching method in a sidelink relay architecture is provided. The method is performed by a terminal device, and the method includes: receiving a first message from a network device, where the first message includes switching information; and performing switching from a source link to a target link according to the switching information, where at least one of the source link or the target link is a relay link.

According to a second aspect, a switching method in a sidelink relay architecture is provided. The method is performed by a network device, and the method includes: sending a first message, where the first message includes switching information, and the switching information is used to indicate that a terminal device performs switching from a source link to a target link, where at least one of the source link or the target link is a relay link.

According to a third aspect, a switching method in a sidelink relay architecture is provided. The method is performed by a relay terminal device, and the method includes:

receiving a second message from a network device, where the second message includes reconfiguration information; and performing, based on the reconfiguration information, at least one of the following: configuration adding of a sidelink interface; configuration deleting of the sidelink interface; or reconfiguration of a Uu interface.

According to a fourth aspect, a terminal device is provided. The terminal device includes: a receiving module, configured to receive a first message from a network device, where the first message includes switching information; and a link switching module, configured to perform switching from a source link to a target link according to the switching information, where at least one of the source link or the target link is a relay link.

According to a fifth aspect, a network device is provided. The network device includes: a sending module, configured to send a first message, where the first message includes switching information, and the switching information is used to indicate that a terminal device performs switching from a source link to a target link, where at least one of the source link or the target link is a relay link.

According to a sixth aspect, a terminal device is provided. The terminal device includes: a receiving module, configured to receive a second message from a network device, where the second message includes reconfiguration information; and a configuration updating module, configured to perform, based on the reconfiguration information, at least one of the following: configuration adding of a sidelink interface; configuration deleting of the sidelink interface; or reconfiguration of a Uu interface.

According to a seventh aspect, a terminal device is provided. The terminal device includes a processor, a memory, and a computer program that is stored in the memory and that can run on the processor. When the computer program is executed by the processor, the switching method in a sidelink relay architecture according to any one of the first aspect or the third aspect is implemented.

According to an eighth aspect, a network device is provided. The network device includes a processor, a memory, and a computer program that is stored in the memory and that can be run on the processor. When the computer program is executed by the processor, the switching method in a sidelink relay architecture according to the second aspect is implemented.

According to a ninth aspect, a computer-readable storage medium is provided. The computer-readable storage medium stores a computer program, and when the computer program is executed by a processor, the switching method in a sidelink relay architecture according to any one of the first aspect, the second aspect, or the third aspect is implemented.

In the embodiment of this application, a network device to which a remote terminal belongs may send switching information, and the remote terminal performs switching according to the switching information, thereby completing the switching process to ensure service continuity and further improve system performance and user experience.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings:

FIG. 1 is a schematic flowchart of a switching method in a sidelink relay architecture according to an embodiment of this application;

FIG. 2 is a schematic flowchart of a switching method in a sidelink relay architecture according to another embodiment of this application;

FIG. 3 is a schematic flowchart of a switching method in a sidelink relay architecture according to still another embodiment of this application;

DETAILED DESCRIPTION

Figure 4:
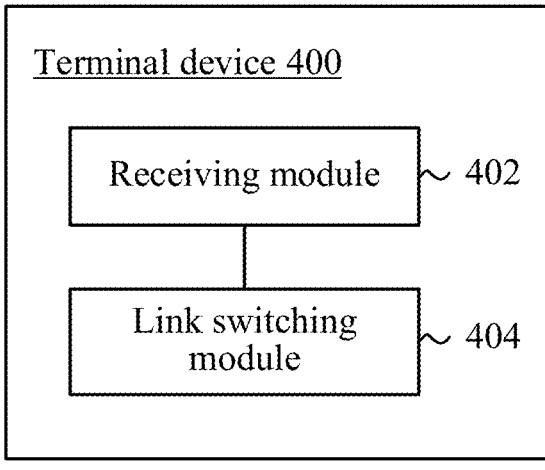
FIG. 4 is a schematic structural diagram of a terminal device according to an embodiment of this application.

To make the objectives, technical solutions, and advantages of this application clearer, the following clearly describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application. The term "and/or" in the embodiments of this specification indicates at least one of the former item or the latter item.

It should be understood that the technical solutions in the embodiments of this application may be performed by various communication systems, such as a Long Term Evolution (LTE) system, an LTE Frequency Division Duplex (FDD) system, LTE Time Division Duplex (TDD), a Universal Mobile Telecommunication System (UMTS) or a Worldwide Interoperability for Microwave Access (WiMAX) communications system, a 5G system or a New Radio (NR) system, an LTE sidelink system, an NR sidelink system, or a subsequent evolution communication system.

In the embodiments of this application, a terminal device may include but is not limited to a Mobile Station (MS), a mobile terminal, a mobile telephone, User Equipment (UE), a handset, portable equipment, a vehicle, and the like. The terminal device may communicate with one or more core networks by using a Radio Access Network (RAN). For example, the terminal device may be a mobile telephone (or referred to as a "cellular" telephone), a computer having a wireless communication function, or the like; or the terminal device may further be a portable, pocket-sized, handheld, computer built-in, or in-vehicle mobile apparatus.

In the embodiments of this application, a network device is an apparatus that is deployed in a radio access network and that is configured to provide a wireless communication function for the terminal device. The network device may be a base station, and the base station may include various types of macro base stations, micro base stations, relay stations, or access points. In systems that use different radio access technologies, devices that have a base station function may have different names. For example, in an LTE network, the device is referred to as an Evolved NodeB (eNB or eNodeB); in a 3rd Generation (3G) network, the device is referred to as a NodeB; in a 5G system, the device is referred to as a next generation NodeB (gNB); or in the subsequent evolved communications system, the device is referred to as a network device. However, the terms do not constitute a limitation.

The implementation idea of the embodiments of this application will be firstly described in the following. As described above, a typical sidelink relay scenario includes a remote terminal device (remote UE, or remote terminal for short) and a relay terminal device (relay UE, or relay terminal for short). For a remote terminal under a layer 2 (L2) sidelink relay architecture, when the remote terminal is in a connected state, a serving cell/base station of its relay terminal is its own serving cell/base station, or a primary cell (Pcell) of the relay terminal may serve as a serving cell of the remote terminal. In some embodiments, the serving cell of the remote terminal may also be another cell that is under a serving base station of the relay terminal and is different from the serving cell of the relay terminal.

The core of the L2 sidelink relay architecture is a layer 3 protocol layer corresponding to the remote terminal, such as a Radio Resource Control (RRC) layer, a Packet Data Convergence Protocol (PDCP) layer, or the like. A layer 3 protocol stack is located on a network device (such as a base station) side. There are only a part of layer 2 and layer 1 protocol stacks between the remote terminal and the relay terminal, such as a Radio Link Control (RLC) layer, a Medium Access Control (MAC) layer, a Physical (PHY) layer, or the like, which are used for data relay, and control functions and security functions that are related to the remote terminal are located on the network device side.

Based on the foregoing description, the serving cell may control the remote terminal to perform switching and change a path of the remote terminal. To implement switching of the remote terminal, as shown in FIG. 1, one embodiment of this application provides a switching method 100 in a sidelink relay architecture, and the method may be performed by a terminal device. In other words, the method may be performed by software or hardware installed in the terminal device. The method includes the following steps.

S102: Receive a first message from a network device, where the first message includes switching information.

This embodiment may be performed by a terminal device: the terminal device may be directly connected to a network device, and in this embodiment, the terminal device is switched from a Uu link directly connected to the network device to a relay link connected to a relay terminal.

The terminal device may also be a remote terminal. In this example, the terminal device is switched from a relay link connected to the relay terminal to a Uu link directly connected to the network device; or the terminal device is switched from a relay link connected to the relay terminal to a relay link connected to another relay terminal.

The first message may be a reconfiguration message, such as an RRCReconfiguration message. The first message includes switching information, and for example, the switching information may be mobilityinfo, or the like.

S104: Perform switching from a source link to a target link according to the switching information, where at least one of the source link or the target link is a relay link.

In this embodiment, the terminal device may switch from a relay link to a Uu link according to the switching information; may also switch from a Uu link to a relay link; or may also switch from a relay link to another relay link.

In one example, the terminal device is switched from a first relay link to a first Uu link according to the switching information, and the first relay link and the first Uu link may be served by a same network node (which may refer to a network device, a serving cell, a serving base station, or the like, which is similar below), or may also be served by different network nodes.

In another example, the terminal device is switched from a second Uu link to a second relay link according to the switching information, and the second relay link and the second Uu link may be served by a same network node, or may also be served by different network nodes.

In still another example, the terminal device is switched from a third relay link to a fourth relay link according to the switching information, and the third relay link and the fourth relay link may be served by a same network node, or may also be served by different network nodes.

In some embodiments, after being switched from the source link to the target link, the terminal device may also send a completion message for the first message to the network device, where the completion message is used to indicate that switching of the terminal device is completed. In this embodiment, if a switched target link is a Uu link, the terminal device directly sends the completion message to a target network device; or if a switched target link is a relay link, the terminal device sends the completion message to a target relay terminal, and the target relay terminal forwards the completion message to the network device.

In the switching method in a sidelink relay architecture provided in this embodiment of this application, a network device to which a remote terminal belongs may send switching information, and the remote terminal performs switching according to the switching information, thereby completing the switching process, to ensure service continuity and further improve system performance and user experience.

In some embodiments, after a terminal device, such as a remote terminal (Remote UE), establishes a connection with its serving cell/base station, the serving cell may perform measurement configuration on the terminal device, so that the terminal device may measure its surrounding cells and/or relay terminals and report a measurement report in a case that a reporting condition is met.

In one example, before the embodiment 100 receives the first message from the network device, the method further includes: receiving measurement configuration information; and performing measurement reporting according to the measurement configuration information.

In some embodiments, the foregoing measurement configuration information is used to indicate that the terminal device measures at least one of the following 1) to 4): 1) signal quality of a current serving cell; 2) signal quality of a potential cell other than the serving cell, that is, the terminal device may be switched to the potential cell, and the potential cell may be a neighboring cell of the serving cell, or the like; 3) link quality between the terminal device and a current serving relay terminal; or 4) link quality between the terminal device and a potential relay terminal, that is, the terminal device may be switched to establish a relay link with the potential relay terminal.

In some embodiments, the foregoing measurement configuration information is used to indicate that the terminal device measures the link quality between the terminal device and the potential relay terminal in the foregoing 4). In this way, before the performing measurement reporting according to the measurement configuration information, the method further includes at least one of the following two steps 1) or 2).

1) Receive a broadcast message from the potential relay terminal, where the broadcast message is used to indicate that the potential relay terminal supports providing a relay service.

In this example, the potential relay terminal actively sends the broadcast message, indicating that it supports providing a relay service to other UEs. In some embodiments, the broadcast message may also include supporting service information, that is, the potential relay terminal may broadcast service information that the potential relay terminal may support relay.

2) Send a request message, where the request message is used to request a relay terminal that provides a relay service; or receive a response message from the potential relay terminal, where the response message is used to indicate that the potential relay terminal supports providing the relay service.

In this example, the terminal device (remote terminal) broadcasts a message to the surrounding, asking which relay terminal may provide a relay service, and a competent potential relay terminal may respond and inform the remote terminal that it supports providing the relay service. In some embodiments, the request message sent by the terminal device may also carry service information, and only a potential relay terminal that can support the relay service for the service (corresponding to the service information) responds.

In some embodiments, the measuring the link quality between the terminal device and the potential relay terminal includes: measuring the link quality between the terminal device and the potential relay terminal according to at least one of the following 1) to 4): 1) the broadcast message; 2) the request message; 3) the response message; 4) a reference signal from the potential relay terminal.

In some embodiments, in a case that there are a plurality of potential relay terminals, among the plurality of potential relay terminals, a terminal device-reported potential relay terminal is: 1) a potential relay terminal with a best link quality; or 2) a potential relay terminal capable of providing a preset service requirement, such as large bandwidth, low latency, or other service requirements; or 3) a potential relay terminal that establishes an association relationship with the terminal device, where the association relationship is, for example, a binding relationship established between a user's wearable device and the user's mobile phone.

In some embodiments, the performing measurement reporting according to the measurement configuration information mentioned in the foregoing embodiments includes: performing reporting in a case that at least one of the following conditions 1) to 9) is met:

1) Measurement result of the serving cell or the current serving relay terminal is higher than a first threshold (it may be understood that the first threshold corresponding to the serving cell and the first threshold corresponding to the relay terminal may be different, and subsequent examples are similar).

2) Measurement result of the serving cell or the current serving relay terminal is lower than a second threshold.

3) Measurement result of the potential relay terminal is higher than the measurement result of the current serving relay terminal plus an offset.

4) Measurement result of the potential cell or the potential relay terminal is higher than a third threshold.

5) Measurement result of the serving cell is lower than a fourth threshold, and measurement result of the potential relay terminal is higher than a fifth threshold.

6) Measurement result of the current serving relay terminal is lower than a sixth threshold, and measurement result of the potential relay terminal or the potential cell is higher than a seventh threshold.

7) Measurement result of the potential cell across a radio access technology RAT or the potential relay terminal across the RAT is higher than an eighth threshold.

8) Measurement result of the serving cell is lower than a ninth threshold, and measurement result of the potential relay terminal across the RAT is higher than a tenth threshold.

9) Measurement result of the current serving relay terminal is lower than an eleventh threshold, and measurement result of the potential relay terminal across the RAT or the potential cell across the RAT is higher than a twelfth threshold.

It should be noted that these thresholds from the first threshold to the twelfth threshold mentioned in this embodiment may all be different, or may be partially the same or partially different.

In embodiment 100, the terminal device may further receive PDCP reconstruction indication information; and perform operations of security reset and header compression reset according to the PDCP reconstruction indication information.

In embodiment 100, the terminal device may further receive PDCP recovery indication information; and perform data recovery-related operations according to the PDCP recovery indication information.

In the foregoing two embodiments, if an Acknowledged Mode (AM) is configured with a status reporting function, the method further includes: sending a first status report; and retransmitting, according to the received second status report, a packet that is not successfully transmitted on the source link.

Embodiment 100 further includes at least one of the following: deleting RLC entity configuration; deleting configuration that is of a MAC layer and is related to the source link; or stopping a timer that is of the MAC layer and is related to the source link.

To describe the switching method in a sidelink relay architecture provided by the foregoing embodiments of this application in detail, the switching method will be described below with reference to several specific embodiments.

Embodiment 1: Measurement Configuration

In this embodiment, when one UE is directly connected to a serving cell or is connected to a serving cell though relay UE, the serving cell may configure measurement configuration related to sidelink relay path switching for the UE according to capability information (for example, whether the UE supports cross-carrier capability), tendency information (for example, energy saving is expected, it is more desired to connect a relay link, or the like), or request information (for example, energy saving is expected, it is more desired to connect a Uu link, or the like) of the UE.

For remote UE connected to the serving cell through the relay UE, the serving cell clearly knows that this is remote UE through information in signaling and/or path information, and may know a relay UE node corresponding to the remote UE. Then, after inquiring about the remote UE's capability/tendency/request, or the like, the measurement configuration is configured for the remote UE for a next switching to select a target node (which may be a network node or a relay terminal).

For UE directly connected to the serving cell, the serving cell may inquire about the UE's capability/tendency/request, or the like, the measurement configuration may be configured for the serving cell, for example, sending measurement configuration information for a next switching to select a target relay node.

In some embodiments, the UE measurement configuration mainly includes at least one of the following 1) to 4).

1) Signal quality of a current serving cell of the UE (the UE is directly connected to the serving cell, and/or the remote UE is relayed and connected to the serving cell through the relay UE), where the signal quality is, for example, reference signal received power (RSRP), reference signal received quality (RSRQ), or the like.

In this example, the UE may be configured for periodic reporting or event-triggered reporting, where the event-triggered reporting may configure a measurement threshold. If the RSRP of the serving cell is lower than a threshold 1 or the RSRP of the serving cell is higher than a threshold 2, then reporting a measurement report may be triggered.

2) The UE measures signal quality of other non-serving cells (other potential cells for short), such as RSRP, RSRQ, or the like.

In this example, the UE may be configured for periodic reporting or event-triggered reporting, where the event-triggered reporting may configure a measurement threshold. For example, if the RSRP of the potential cells is higher than the threshold 1, or the RSRP of the potential cells is higher than the RSRP of the serving cell plus an offset, then reporting a measurement report may be triggered.

3) Link quality between the remote UE and the current serving relay terminal is measured.

In this example, the remote UE may be configured for periodic reporting or event-triggered reporting, for example, where the event-triggered reporting may configure a measurement threshold. If the link quality between the remote UE and the current relay terminal is lower than the threshold, then measurement reporting may be triggered.

Considering that the communication and measurement between UEs are different from the Uu link of an ordinary base station, if a similar periodic reference signal is used for measurement, the UE may obtain continuous and stable measurement results when the signal is measured. However, to save resources and reduce interference, the periodic reference signal is generally not sent between UEs for measurement. In this case, the measurement between UEs is generally performed through a reference signal carried by data. When the UE does not send any data in a certain measurement period, special processing is performed on the measurement value, for example, not updating the measurement value or taking the measurement value of a previous period, or special reporting is performed, for example, in the periodic reporting, there is no measurement value in this period, with direct reporting of null.

4) The UE measures the link quality between the UE and other potential relay UEs.

In this example, the remote UE may be configured for event-triggered reporting. For example, when the link quality between the remote UE and other potential relay UEs is higher than a threshold, the reporting is performed; or when the link quality between the remote UE and other potential relay UEs is higher than the quality of the current serving relay UE plus an offset, or the like, the reporting is performed.

Generally, a method for UE measuring surrounding potential relay UE may be as follows:

First, the UE needs to clearly know that the relay UE of the other party is one UE that has a relay function and may provide the relay function for itself. There are two manners of obtaining information. One manner is that the relay UE actively sends information and broadcasts the information to the surrounding, indicating that it may support a relay service to other UEs; the other manner is that the remote UE makes a request, the remote UE broadcasts the request to the surrounding, asking who may provide the relay service for it, and competent potential relay UE may respond and inform the remote UE that it provides the relay service.

After the function support is determined, it may be determined that the link between the remote UE and the corresponding relay UE meets a communication requirement. Through the foregoing response or signal detection and measurement in the broadcast process, preliminary measurement of the link between the remote UE and the relay UE may be completed, or the link quality may be further confirmed by the remote UE continuously monitoring the signal sent by the relay UE (for example, a measurement reference signal, a data reference signal, or the like). Generally, the link quality between the remote UE and the relay UE needs to meet a minimum threshold requirement. On this basis, the remote UE may select an appropriate one from relay UEs that meet the minimum link quality threshold and report the appropriate relay UE to a network device: 1. If services provided by each relay UE are similar, a best link quality may be selected; 2. If the remote UE needs a higher relay service requirement, such as large bandwidth, low latency, or the like, the relay UE capable of providing these services may be selected, and among candidate relay UEs that meet the requirement, the one with a best link quality, or the one with a highest capability, or the one compromising between the two may be selected; 3. If the remote UE has a special requirement, for example, there is a binding relationship with the relay UE, a typical example is that there is a binding relationship between a user's mobile phone and the user's wearable device, which generally shares a mobile package and has advantages of billing and services, it may be preferentially selected to perform measurement reporting.

It should be noted that, in the foregoing measurement process, triggering conditions for triggering the reporting of the measurement report (regarding the measurement report triggering event between the serving cell, the serving relay UE, other potential cells, and other potential relay UEs), in addition to those mentioned in the foregoing examples, may further include at least one of the following: the measurement result of the serving cell is higher than a threshold; the measurement result of the serving relay UE is higher than the threshold; the measurement result of the serving cell is lower than the threshold; the measurement result of the serving relay UE is lower than the threshold; the measurement result of the other potential cells is higher than the measurement result of the serving cell plus an offset; the measurement result of the other potential relay UEs is higher than the measurement result of the serving relay UE plus an offset; the measurement result of the other potential cells is higher than the threshold; the measurement result of the other relay UEs is higher than the threshold; the measurement result of the serving cell is lower than a threshold 1, and the measurement result of the other potential cells is higher than a threshold 2; the measurement result of the serving cell is lower than the threshold 1, and the measurement result of the other potential relay UEs is higher than the threshold 2; the measurement result of the serving relay UE is lower than the threshold 1, and the measurement result of the other cells is higher than the threshold 2; the measurement result of the serving relay UE is lower than the threshold 1, and the measurement result of the other potential relay UEs is higher than the threshold 2; the measurement result of the other potential cells across a RAT (RADIO ACCESS TECHNOLOGY) is higher than the threshold; the measurement result of the other potential relay UEs across the RAT is higher than the threshold; the measurement result of the serving cell is lower than the threshold 1, and the measurement result of the other potential cells across the RAT is higher than the threshold 2; the measurement result of the serving cell is lower than the threshold 1, and the measurement result of the other potential relay UEs across the RAT is higher than the threshold 2; the measurement result of the serving relay UE is lower than the threshold 1, and the measurement result of the other potential cells across the RAT is higher than the threshold 2; or the measurement result of the serving relay UE is lower than the threshold 1, and the measurement result of the other potential relay UEs across the RAT is higher than the threshold 2.

The other potential cells across the RAT mentioned above are, for example, LTE cells, and the other relay UEs across the RAT are, for example, LTE V2X UEs (only LTE PC5/sidelink interfaces are supported).

It should be noted that values of the thresholds listed above include the threshold 1 and the threshold 2, and these thresholds may all be different, or some of them may be the same, some of them may be different, or the like.

In addition, generally, the measurement result from a network device is only compared with the measurement result also from a network device, and the measurement result from a relay UE is only compared with the measurement result also from a relay UE. Generally, the two are not directly compared in size, the threshold requirements may be met individually, or the triggering may be performed only when the thresholds are met simultaneously.

For example, it is required that the measurement result of the serving cell is lower than the threshold, while the measurement result between the serving cell and the relay UE is higher than the threshold. In this case, the event trigger condition is met, and the measurement report is reported. After receiving such a measurement report, the network device may switch the UE from the Uu link to the relay link.

Embodiment 2: Switching Between a Uu Link and a Relay Link of a Co-Network Device (Base Station)

The embodiment of this application presents a most typical switching process in an L2 sidelink relay architecture, that is, a switching process between a UE1<->gNB1 link and a remote UE1<->relay UE2<->gNB1 link. UE1 in the former link and remote UE1 in the latter link are a same terminal device, but have different names in different links.

The switching process provided in this embodiment is as follows.

Step 0: The UE1/remote UE1 accesses a gNB1 and selects a cell under the gNB1 as its serving cell cell1, and an RRC connection is established between the UE1 and the cell1.

If the UE1 is directly connected to the cell1, the UE1 may have a plurality of serving cells, for example, a plurality of secondary cells (Scell) configured in a case of Carrier Aggregation (CA), and in this case, the cell1 may be a primary cell (Pcell), or may also be a special cell (spcell).

If it is remote UE1, it establishes a connection with the cell1 through relay UE2, that is, peers of an RRC protocol stack are respectively located in the remote UE1 and the cell1, and the relay UE2 only performs layer 2 transfer on data. In general, the cell1 is also a serving cell of the relay UE2, and is usually a Pcell or spcell of the relay UE2. If it is remote UE1, because it is logically connected to the gNB1, only one cell1 may be connected, and there is no need to check other Scells of the relay UE2.

Step 1: The cell1 configures measurement for the UE1.

In this example, cell1 may configure, according to the capabilities/propensities/requests of the UE1, various combined measurement quantities about the serving cell, other cells, the serving relay, and other relays.

For example, if the UE1 is directly connected to the cell1, and it is desired to save power, or its own sending and receiving capabilities are limited, or it is desired to preferentially support the sidelink relay architecture, then in the measurement configuration, it is more effective to report that the serving cell is lower than a threshold and the relay UE is higher than the threshold. After this condition is met, the UE is easily switched to the relay link as soon as possible by the gNB1.

For example, if the UE1 is remote UE, a network side may configure different measurement configurations according to whether the UE1 has a bound relay relationship. If the remote UE1 has open access to any relay UE, the measurement configuration needs to consider the quality of the serving relay UE, the quality of other potential relay UEs, the quality of the serving cell, the quality of other potential cells, or the like, so as to determine whether the remote UE1 chooses other relay links or the Uu link. If the remote UE1 only wants to access specific relay UE2, the measurement configuration only needs to consider the quality of the serving relay cell, the quality of the serving cell, the quality of other cells, or the like, so as to make a preferred choice between the relay UE2 and the Uu link for the remote UE1.

In some embodiments, if it is remote UE1, the measurement configuration is relayed by the relay UE2, firstly sent by the cell1 to the relay UE2 through a Uu interface, and then sent by the relay UE2 to the remote UE1 through a sidelink interface.

Step 2: The UE1 meets a measurement trigger condition, and reports the measurement result to the cell1.

The measurement trigger generally includes that the link quality of a current node is poor and/or the link quality of other nodes is good. For example, when the UE1 is directly connected to the cell1, and the link quality of the cell1 lower than the threshold and the link quality of the relay UE2 higher than the threshold are reported, the UE1 may be switched from the path directly connected to the cell1 to the path connected to the cell1 through the relay UE2. On the contrary, when the remote UE1 is connected to the cell1 through the relay UE2, and the link quality of the cell1 higher than the threshold and the link quality of the relay UE2 lower than the threshold are reported, the UE1 may be switched from the path connected to the cell1 through the relay UE2 to the path directly connected to the cell1.

In some embodiments, before Step 3, the cell1 may need to interact with the relay UE2, whether the relay UE2 supports that the UE1 is switched from a direct link to a relay path under the relay UE2, and after the confirmation is obtained from the relay UE2, reconfiguration information/switching command is sent. This process may also be omitted. The remote UE1 and the relay UE2 confirm each other in a measurement phase. Only when the relay UE2 agrees to accept the remote UE1, the remote UE1 would report the measurement result related to the relay UE2.

Step 3: The cell1 sends a first message to the UE1.

The first message may be a reconfiguration message, which includes switching information, such as a new path indication, configuration under the new path, or the like.

If the UE1 is directly connected to the cell1, the cell1 informs, through the first message, that the UE1 is switched to the relay UE2 and carries configuration related to the relay UE2 link. Since higher-layer parts (that is, RRC/PDCP) of each Data Radio Bearer (DRB) and Signaling Radio Bearer (SRB) is still in the cell1 in this case, the related two layers generally do not need to be reconfigured (it may also be reconfigured). For the security operation, whether to perform a security update process is decided as needed, the RLC/MAC/PHY layers of the UE1 will be directly connected to the relay UE2, so reconfiguration may be performed. Incremental changes may also be made on old configuration logically. Some configurations of the UE1 on the sidelink link may also be carried, because the cell1 has a better understanding on the service situation of the UE1, and may directly configure resources of the sidelink link for the UE1 in this case, for example, a resource pool, authorized dedicated periodic resources, or the like.

If the remote UE1 is connected to the cell1 through the relay UE2, the cell1 informs, through the first message, the UE1 of switching to the path directly connected to the cell1, and carries new path configuration. Likewise, a layer 3 part has not changed, the PDCP/RRC is still anchored in the cell1. Therefore, the related two layers generally do not need to be reconfigured (it may also be reconfigured). For the security operation, whether to perform a security update process is decided as needed, the RLC/MAC/PHY layers of the UE1 will be directly connected to the cell1, so reconfiguration may be performed. Incremental changes may also be made on old configuration logically. Some configurations of the UE1 on the Uu link may also be carried, because the cell1 has a better understanding on the service situation of the UE1, and may directly configure resources of the Uu link for the UE1 in this case, for example, authorized dedicated periodic resources, or the like.

In some embodiments, before Step 4, the following steps may be further included: The cell1 sends a second message (for example, may be a reconfiguration message) to the relay UE2, carrying path information and configuration information about the remote UE1.

If the UE1 is directly connected to the cell1, the cell1 informs, through the second message, the relay UE2 that the remote UE1 is about to switch back, sidelink configuration is configured for the relay UE2, so as to communicate with the remote UE1, or configuration is configured or Uu interface configuration is modified for the relay UE2, so as to carry data of the remote UE1.

If the remote UE1 is connected to the cell1 through the relay UE2, the cell1 informs, through the second message, the relay UE2 that the remote UE1 is about to switch, the sidelink connection with the remote UE1 may be released, the configuration or the modified Uu interface configuration for the relay UE2 may be deleted, and the resources for carrying the data of the remote UE1 are released.

Step 4: The UE1 receives the first message from the cell1, and after accessing a new node, sends a completion message of the first message (for example, switching completion signaling) to the cell1.

If the UE1 directly connected to cell1 receives a command of switching to the relay UE2, that is, the first message, the establishment of PC5 RRC and bearer with the relay UE2 is initiated, the relevant configuration is applied, and switching completion signaling is sent to the relay UE2, which relays the signaling to the cell1.

If the remote UE1, connected to the cell1 through the relay UE2, receives a command of switching to directly connect the cell1, that is, the first message, a random access procedure is initiated to the cell1, the Uu interface configuration is applied, switching completion signaling is sent to the cell1, and the PC5 RRC and bearer with the relay UE2 are released.

In some embodiments, before Step 5, the following steps may be further included: The relay UE2 receives a second message from the cell1, and after performing the link change, a completion message of the second message is sent to the cell1.

If the UE1 is directly connected to the cell1 and receives a command of switching to the relay UE2, that is, the second message, the PC5 RRC and bearer are established between the relay UE2 and the remote UE1, and the related sidelink configuration and Uu configuration are applied. The completion message of the second message (switching completion signaling) is sent to the cell1, which relays the signaling and data of the remote UE1.

If the UE1 is connected to the cell1 through the relay UE2 and receives a command of switching to a direct connection, that is, the second message, the relay UE2 disconnects the sidelink link with the remote UE1, applies related Uu configuration modification, and sends the completion message (switching completion signaling) of the second message to the cell1.

Step 5: The cell1 receives the switching completion signaling of the UE1 (that is, the completion message of the first message). In some embodiments, the cell1 receives the completion message of the second message of the relay UE2, and the entire switching process ends.

Embodiment 3: Switching Between a Relay Link and a Relay Link of a Co-Base Station This embodiment provides a process for switching remote UE1 between relay UE2 and relay UE3, where the relay UE2 and the relay UE3 have a same serving base station and do not need to interact across a base station.

The switching process in this embodiment is as follows.

Step 0: The remote UE1 first establishes a connection with a cell1 through the relay UE2, a layer 3 protocol stack of the remote UE1 is anchored in the cell1, and the relay UE2 transfers the data through an L2 protocol stack.

Step 1: The cell1 configures measurement for the remote UE1.

In this embodiment, the remote UE1 is one open UE, or both the relay UE2 and the relay UE3 are served by its desired connected devices. Measuring configuration information may include: measuring the link quality of the serving relay UE2, measuring Uu link quality (the serving cell cell1, and other cells), and measuring the link quality of other potential relay UEs (including the relay UE3).

Step 2: A measurement event is triggered, and the remote UE1 reports a measurement result.

The measurement event in this embodiment is: the link quality of the serving relay UE2 lower than a threshold, and/or the link quality of the potential relay UE3 higher than the threshold, or the link quality of the serving relay UE2 lower than the link quality of the potential relay UE3 plus an offset, or the like.

In some embodiments, before Step 3, the cell1 may also interact with the relay UE3, for example, asking the relay UE3 whether it supports a relay path in which the UE1 is switched from the relay UE2 to the relay UE3, and then sends a first message after obtaining confirmation from the relay UE3. This process may also be omitted. The remote UE1 and the relay UE3 confirm each other in a measurement phase. Only when the relay UE3 agrees to accept the remote UE1, the remote UE1 would report the measurement result related to the relay UE3.

Step 3: The cell1 sends a first message to the remote UE1, and informs the remote UE1 to switch to the relay UE3.

The first message may include configuration update of a bearer or layer 3, which generally may not be updated because there is no change; indicating whether a security operation is updated; and carrying sidelink configuration on a new link.

In some embodiments, before Step 4, the following steps may be further included: The cell1 sends a second message (for example, a reconfiguration message) to the relay UE2, and informs the remote UE1 that the relay UE2 is to be switched out.

The second message may include reconfiguration on a relay UE2 Uu interface, such as deleting some DRBs, or deleting some data streams mapped in the DRBs, deleting configuration related to transmission of the remote UE1, and simultaneously indicating release of sidelink resources and configurations.

In some embodiments, before Step 4, the following steps may be further included: The cell1 sends a second message to the relay UE3, and informs the remote UE1 that it is switched to the relay UE3.

The second message includes reconfiguration on a relay UE3 Uu interface, such as adding or modifying some DRBs, or adding some data streams mapped in the DRBs, adding configuration related to transmission of the remote UE1, and simultaneously indicating sidelink resources allocation and configuration.

Step 4: The remote UE1 receives the first message, releases a PC5 RRC connection with a source relay UE2, establishes PC5 RRC and corresponding data bearer configuration with a target relay UE3, and then sends a completion message (switching completion signaling) of the first message to the cell1.

In some embodiments, after receiving the second message, the relay UE2 releases the PC5 RRC connection with the remote UE1, performs bearer change configuration of the Uu interface according to new configuration, and then sends a completion message of the second message to the cell1.

In some embodiments, after receiving the second message, the relay UE3 establishes the PC5 RRC connection and bearer with the remote UE1, performs bearer configuration of the Uu interface according to new configuration, and then sends a completion message of the second message to the cell1.

Step 5: The cell1 receives the completion message of the remote UE1. In some embodiments, after receiving the completion message of the relay UE2 and the completion message of the relay UE3, it is considered that the switching process ends.

Embodiment 4: Switching Between a Uu Link and a Relay Link Across a Base Station This embodiment is similar to Embodiment 2, and describes the switching between the Uu link and the relay link. The difference is that in Embodiment 2, both the source path and the target path are under the control of a same base station, while this embodiment considers a cross-base station scenario.

In this embodiment, parts similar to those of Embodiment 2 are omitted in the description, differences from Embodiment 2 are mainly described, and the switching steps are as follows.

Step 0: UE1 directly accesses or accesses a cell1 under a gNB1 through relay UE2.

Step 1: The cell1 configures measurement for the UE1.

In this embodiment, measurement configuration for the UE1 may include or not limit performing measurement on other potential neighboring cells/neighboring base stations; or on relay UEs under the neighboring cells/neighboring base stations.

Step 2: The UE1 triggers measurement reporting, and reports measurement results to the cell1.

These measurement results generally include cells of the neighboring base stations, or relay UEs under the neighboring base stations. For example, for remote UE1 located at the cell edge, due to the deterioration of its relay link, for example, the link quality of the sidelink is lower than a threshold, but the link quality of the UE1 to a cell2 under the neighboring gNB2 is higher than the threshold; or for UE1 located at the cell edge and directly connected to the cell1, the link quality of the local cell is lower than the threshold, and the link quality between the UE1 and the relay UE2 under the cell2 of the neighboring cell gNB2 is higher than the threshold.

Step 3: The cell1 (under the gNB1) decides to switch the UE1 to the neighboring base station gNB2, and initiates a switching request to the neighboring base station through an Xn interface (an interface between NR base stations) or an X2 interface (an interface with an LTE base station) between base stations.

The switching request generally carries configuration, service situation, measurement result, or the like of the UE1 in the source cell, and those are sent to the gNB2 by the gNB1.

Step 4: After receiving the switching request message carried by an inter-base station interface message sent by the gNB1, the gNB2 performs admission decision and configuration, and returns configuration information under a new link to the gNB1.

If the UE1 wants to access a cell2 under the gNB2, then the gNB2 makes a decision directly.

If the UE1 wants to access relay UE2 under the cell2 of the gNB2, before making the decision, In some embodiments, the gNB2 may confirm to the relay UE2 first, and then replies to switching admission result and configuration after the permission confirmation is obtained; or by default, when the UE1 and the UE2 previously performed sidelink measurement, they have already exchanged information with each other that may support relay, the UE1 can report the UE2 in the measurement report, indicating that capabilities and willingness of the UE2 have been confirmed, so there is no need to consult the UE2 here, and the gNB2 directly makes decisions and performs configurations.

In this embodiment, the configuration information that is returned to the gNB1 by the gNB2 mainly includes one of the following 1) or 2). 1) If the UE1 accesses the cell2 under the gNB2, it mainly includes configuration of accessing the Uu, such as related bearer configuration and protocol layer configuration, PDCP/RLC/MAC/PHY, or the like. In this case, since cells under other base stations serve the UE, various configuration changes may exist. 2) If the UE1 accesses to the relay UE2 under the cell2 of the gNB2, it mainly includes bearer-related configuration, sidelink interface configuration and resources, or the like. In this case, it is also necessary to decide configuration for the relay UE2, mainly including the sidelink interface configuration and resources, the Uu interface bearer addition and modifications, used to bear data of the remote UE1.

In some embodiments, before Step 5, the following steps may be further included: The cell2 under the gNB2 sends a second message (such as a reconfiguration message) to the relay UE2 for performing sidelink interface configuration and resource configuration with the UE1, Uu interface bearer changes, or the like; after the UE2 applies the second message for configuration, it returns a completion message of the second message to the cell2.

Step 5: The gNB1 receives the switching admission message and configuration message returned by the gNB2, organizes them into a first message, and the first message is sent to the UE1 by the cell1.

Step 6: The UE1 receives the message, disconnects the source connection, accesses a new target node, applies new configuration, and returns the completion message to a new serving cell cell2.

If it is switched from the source relay link to directly accessing the cell2, the sidelink connection with the original relay is deleted, the new configuration is applied, and the cell2 is accessed in the random access process.

If it is switched from the source cell1 link to accessing the cell2 by the relay UE2, the new configuration is applied, a sidelink link is established with the relay UE2, and the completion message is returned to the cell2 through the relay UE2.

Step 7: The cell2 receives the completion message of the UE1. In some embodiments, after receiving the completion message of the relay UE2, it is considered that the switching is successful and the switching is completed.

Embodiment 5: Switching Between a Relay Link and a Relay Link Across a Base Station This embodiment describes a process of switching remote UE1 from relay UE2 under a gNB1 to relay UE3 under a gNB2. The switching process is as follows.

Step 0: The remote UE1 accesses a cell1 under the gNB1 through the relay UE2.

Step 1: The cell1 configures measurement for the remote UE1.

A measurement quantity may include various measurement of neighboring cells and measurement of relay UEs under the neighboring cells.

Step 2: The remote UE1 triggers a measurement event, and performs measurement reporting on the cell1.

In this embodiment, possible measurement reporting results include: the link quality from the remote UE1 to the relay UE2 lower than a threshold, and/or the link quality from the remote UE1 to the relay UE3 higher than the threshold, and the relay UE3 belongs to base station/cell information.

Step 3: The cell1 decides to switch the remote UE1 from the relay UE2 to the relay UE3 under a neighboring gNB2, the gNB1 sends an interface message to the gNB2, carrying switching request message, which includes configuration and service information of the UE1 in a source cell.

Step 4: The gNB2 receives the switching request message, generates admission and configuration information, and returns the successful admission and configuration information to the gNB1.

In some embodiments, the gNB2 may perform signaling interaction with the relay UE3, to inquire whether the remote UE1 is allowed to access, and the admission is successful only after the confirmation is obtained.

In some embodiments, before Step 5, the following steps may be further included: The cell2 sends a second message (for example, a reconfiguration message) to the relay UE3, including sidelink configuration and Uu interface configuration update of the relay UE3 and the remote UE1; and after receiving the second message, the relay UE3 sends a completion message of the second message to the cell2.

Step 5: The cell1 receives the successful admission and configuration information, organizes a first message and sends it to the UE1. The first message mainly includes bearer configuration, sidelink interface configuration, resource configuration, or the like.

In some embodiments, the cell1 sends the second message to the relay UE2, to release and modify the sidelink configuration related to the remote UE1 and the Uu interface configuration; and the relay UE2 is successfully configured and returns a completion message to the cell1.

Step 6: The UE1 receives the first message, performs new configuration according to an instruction, releases the old sidelink connection with the relay UE2, establishes a new connection and a corresponding bearer and layer 3 configuration with the relay UE3, and sends the completion message to the cell2 through the relay UE3.

Step 7: The cell2 receives a response of the UE1 and the completion message of the UE3, and it is considered that the switching is completed.

Embodiment 6: PDCP/RLC/MAC Processing and Data Forwarding Caused by Remote UE Switching For remote UE, once a first message is received, each layer performs the following operations:

The PDCP layer applies new configuration. If a PDCP reconstruction indication is received, security reset and header compression reset are performed, and security operation and header compression followed by the reset are performed on subsequent data. If an AM is configured with a status reporting function, a status report is returned to a peer, a packet that is not transmitted successfully is retransmitted according to the status report sent by the peer, and then new data transmission is started. If a PDCP data recovery indication is received, corresponding actions for data recovery are performed, security and header compression operations continue. If an AM is configured with a status reporting function, a status report is returned to a peer, a packet that is not transmitted successfully is retransmitted according to the status report sent by the peer, and then new data transmission is started.

Generally, serving cells of the remote UE are served by different gNBs, may indicate PDCP reconstruction, and is used to maintain security isolation between different nodes. If service cells of the remote UE have not changed, or are served by a same gNB, PDCP data recovery may be selected in principle, because only a data path has changed in this case, and a PDCP anchor point has not changed, which is still in the cell1/gNB1. The security operations can continue, but it is also possible to indicate the PDCP reconstruction to perform a security update process.

At the RLC layer, once path switching occurs, RLC entity configuration is deleted, and all unfinished PDUs/SDUs are deleted. New configuration is performed by retransmit data.

The MAC layer deletes and stops configuration and timers related to the source link, and re-applies the new configuration.

The source relay UE deletes all configuration, data, or the like related to the remote UE.

New relay UE establishes new sidelink bearer and configuration for the remote UE, and modifies the Uu interface configuration, or the like.

When the UE1 is switched under a base station, a data anchor point is still under a same gNB, and data forwarding is not required. The gNB performs PDCP reconstruction or data recovery indications as needed, and performs data reception status feedback and retransmission process on the AM-supported status report bearer.

When the UE1 is switched from a source gNB1 to a target gNB2, and the data anchor point has changed, data forwarding and PDCP SN status transfer are required in this case. The gNB1 needs to send a PDCP SN status to the gNB2, forwards uplink and downlink data to the gNB2 according to negotiation, and sends the data on a new path.

The switching method in a sidelink relay architecture according to an embodiment of this application has been described in detail above with reference to FIG. 1. A switching method in a sidelink relay architecture according to another embodiment of this application will be described in detail below with reference to FIG. 2. It may be understood that interaction between a network device and a terminal device described on the network device side is the same as that described on the terminal device side in the method shown in FIG. 1. To avoid repetition, relevant descriptions are appropriately omitted.

FIG. 2 is a schematic flowchart for implementing a switching method in a sidelink relay architecture according to an embodiment of this application, which may be performed by a network device side. As shown in FIG. 2, the method 200 includes: S202: sending a first message, where the first message includes switching information; and the switching information is used to indicate that a terminal device performs switching from a source link to a target link, where at least one of the source link or the target link is a relay link.

In the embodiment of this application, a network device to which a remote terminal belongs may send switching information, and the remote terminal performs switching according to the switching information, thereby completing the switching process to ensure service continuity and further improve system performance and user experience.

In one embodiment, the method further includes: sending a second message, where the second message includes reconfiguration information; and the reconfiguration information is used to indicate that a relay terminal performs at least one of the following: configuration adding of a sidelink interface; configuration deleting of the sidelink interface; or reconfiguration of a Uu interface.

In one embodiment, before the sending a first message, the method further includes: sending an access request message to a target relay terminal, where the request message is used to request a terminal device to access the target relay terminal; and receiving a response message from the target relay terminal, where the response message indicates that the terminal device is allowed to access.

In one embodiment, the method further includes: sending a switching request message to a target network device; where the switching request message is used to request a terminal device to switch to a target relay terminal, and the target relay terminal is located in a cell provided by the target network device; or the switching request message is used to request a terminal device to switch to a cell provided by the target network device.

In one embodiment, the method further includes: receiving configuration information from the target network device, where the configuration information includes at least one of the following: Uu configuration of the target network device; bearer-related configuration of the target network device; sidelink interface configuration of the target relay terminal; or sidelink resource configuration of the target relay terminal.

In one embodiment, the method further includes: sending measurement configuration information, where the measurement configuration information is used to indicate that the terminal device performs measurement reporting.

A switching method in a sidelink relay architecture according to another embodiment of this application will be described in detail below with reference to FIG. 3. It may be understood that description from a relay terminal side is the same as the description on the terminal device side in the method shown in FIG. 1. To avoid repetition, relevant descriptions are appropriately omitted.

FIG. 3 is a schematic flowchart for implementing a switching method in a sidelink relay architecture according to an embodiment of this application, which may be performed by a relay terminal side. As shown in FIG. 3, the method 300 includes the following steps.

S302: Receive a second message from a network device, where the second message includes reconfiguration information.

S304: Perform at least one of the following based on the reconfiguration information: configuration adding of a sidelink interface; configuration deleting of the sidelink interface; or reconfiguration of a Uu interface.

In the embodiment of this application, a network device to which a remote terminal belongs may send switching information, and the remote terminal performs switching according to the switching information, thereby completing the switching process to ensure service continuity and further improve system performance and user experience.

In one embodiment, the method further includes: receiving an access request message from the network device, where the request message is used to request a terminal device to access; and sending a response message, where the response message indicates that the terminal device is allowed to access.

In one embodiment, the method further includes: establishing, with a terminal device, an RRC connection of a PC5 interface and a bearer of the PC5 interface; and sending a completion message (switching completion signaling) of the second message to the network device.

In one embodiment, the method further includes: releasing, with a terminal device, an RRC connection of a PC5 interface and a bearer of the PC5 interface; and sending a completion message (switching completion signaling) of the second message to the network device.

The switching method in a sidelink relay architecture according to an embodiment of this application has been described in detail above with reference to FIG. 1 to FIG. 3. A terminal device according to an embodiment of this application will be described in detail below with reference to FIG. 4.

FIG. 4 is a schematic structural diagram of a terminal device according to an embodiment of this application. As shown in FIG. 4, the terminal device 400 includes: a receiving module 402, which may be configured to receive a first message from a network device, where the first message includes switching information; and a link switching module 404, which may be configured to perform switching from a source link to a target link according to the switching information, where at least one of the source link or the target link is a relay link.

In the embodiment of this application, a network device to which a remote terminal belongs may send switching information, and the remote terminal performs switching according to the switching information, thereby completing the switching process to ensure service continuity and further improve system performance and user experience.

In one embodiment, the link switching module 404 may be configured to perform switching from a first relay link to a first Uu link according to the switching information; or perform switching from a second Uu link to a second relay link according to the switching information; or perform switching from a third relay link to a fourth relay link according to the switching information. The first relay link and the first Uu link are served by a same network node or are served by different network nodes; the second relay link and the second Uu link are served by a same network node or are served by different network nodes; and the third relay link and the fourth relay link are served by a same network node or are served by different network nodes.

In one embodiment, the terminal device 400 further includes a sending module, which may be configured to send a completion message for the first message.

In one embodiment, the receiving module 402 may be configured to receive measurement configuration information; and perform measurement reporting according to the measurement configuration information.

In one embodiment, the measurement configuration information is used to indicate that the terminal device measures at least one of the following: signal quality of a current serving cell; signal quality of a potential cell other than the serving cell, link quality between the terminal device and a current serving relay terminal; or link quality between the terminal device and a potential relay terminal.

In one embodiment, the measurement configuration information is used to indicate that the terminal device measures the link quality between the terminal device and the potential relay terminal. The receiving module 402 may be configured to receive a broadcast message from the potential relay terminal, where the broadcast message is used to indicate that the potential relay terminal supports providing a relay service; and/or the terminal device 400 further includes a sending module, which may be configured to send a request message, where the request message is used to request a relay terminal that provides a relay service; and a receiving module 402, which may be configured to receive a response message from the potential relay terminal, where the response message is used to indicate that the potential relay terminal supports providing the relay service.

In one embodiment, the measuring the link quality between the terminal device and the potential relay terminal includes: according to at least one of the following, measuring the link quality between the terminal device and the potential relay terminal: the broadcast message; the request message; the response message; or a reference signal from the potential relay terminal.

In one embodiment, there are a plurality of potential relay terminals. Among the plurality of potential relay terminals, a reported potential relay terminal is: a potential relay terminal with a best link quality; a potential relay terminal capable of providing a preset service requirement; or a potential relay terminal that establishes an association relationship with the terminal device.

In one embodiment, the performing measurement reporting according to the measurement configuration information includes: performing reporting in a case that at least one of the following conditions is met: measurement result of the serving cell or the current serving relay terminal is higher than a first threshold; measurement result of the serving cell or the current serving relay terminal is lower than a second threshold; measurement result of the potential relay terminal is higher than the measurement result of the currently serving relay terminal plus an offset; measurement result of the potential cell or the potential relay terminal is higher than a third threshold; measurement result of the serving cell is lower than a fourth threshold, and measurement result of the potential relay terminal is higher than a fifth threshold; measurement result of the current serving relay terminal is lower than a sixth threshold, and measurement result of the potential relay terminal or the potential cell is higher than a seventh threshold; measurement result of the potential cell across an RAT or the potential relay terminal across the RAT is higher than an eighth threshold; measurement result of the serving cell is lower than a ninth threshold, and measurement result of the potential relay terminal across the RAT is higher than a tenth threshold; or measurement result of the current serving relay terminal is lower than an eleventh threshold, and measurement result of the potential relay terminal across the RAT or the potential cell across the RAT is higher than a twelfth threshold.

In one embodiment, the receiving module 402 may be configured to receive PDCP reconstruction indication information; and perform operations of security reset and header compression reset according to the PDCP reconstruction indication information.

In one embodiment, the receiving module 402 may be configured to receive PDCP recovery indication information; and perform data recovery-related operations according to the PDCP recovery indication information.

In one embodiment, if an acknowledged mode is configured with a status reporting function, the terminal device further includes: a sending module, configured to send a first status report; and retransmit, according to the received second status report, a packet that is not transmitted successfully on the source link.

In one embodiment, the terminal device may further include a processing module, which may be configured to perform at least one of the following: deleting RLC entity configuration; deleting configuration that is of a MAC layer and is related to the source link; or stopping a timer that is of the MAC layer and is related to the source link.

For the terminal device 400 according to the embodiment of this application, please refer to the flow corresponding to the method 100 according to the embodiment of this application. Furthermore, each unit/module of the terminal device 400 and the foregoing other operations and/or functions are respectively used to implement the corresponding flow of the method 100, can achieve the same or equivalent technical effect, and will no longer be described herein for the purpose of brevity.

Figure 5:
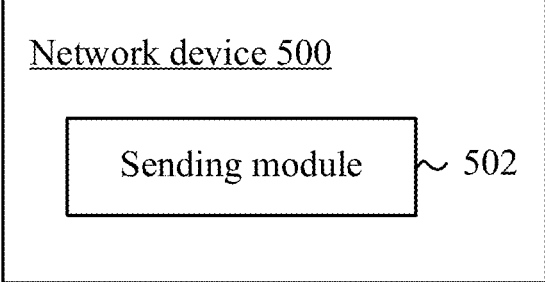
FIG. 5 is a schematic structural diagram of a network device according to an embodiment of this application.

FIG. 5 is a schematic structural diagram of a network device according to an embodiment of this application. As shown in FIG. 5, a network device 500 includes: a sending module 502, which may be configured to send a first message, where the first message includes switching information, and the switching information is used to indicate that a terminal device performs switching from a source link to a target link, where at least one of the source link or the target link is a relay link.

In the embodiment of this application, a network device to which a remote terminal belongs may send switching information, and the remote terminal performs switching according to the switching information, thereby completing the switching process to ensure service continuity and further improve system performance and user experience.

In one embodiment, the sending module 502 may be configured to send a second message, where the second message includes reconfiguration information; and the reconfiguration information is used to indicate that a relay terminal performs at least one of the following: configuration adding of a sidelink interface; configuration deleting of the sidelink interface; or reconfiguration of a Uu interface.

In one embodiment, the sending module 502 may be configured to send an access request message to a target relay terminal, where the request message is used to request a terminal device to access the target relay terminal. The network device 500 may further include a receiving module, which may be configured to receive a response message from the target relay terminal, where the response message indicates that the terminal device is allowed to access.

In one embodiment, the sending module 502 may be configured to send a switching request message to a target network device; where the switching request message is used to request a terminal device to switch to a target relay terminal, and the target relay terminal is located in a cell provided by the target network device; or the switching request message is used to request a terminal device to switch to a cell provided by the target network device.

In one embodiment, the network device 500 may further include a receiving module, which may be configured to receive configuration information from the target network device, where the configuration information includes at least one of the following: Uu configuration of the target network device; bearer-related configuration of the target network device; sidelink interface configuration of the target relay terminal; or sidelink resource configuration of the target relay terminal.

In one embodiment, the sending module 502 may be configured to send measurement configuration information, where the measurement configuration information is used to indicate that the terminal device performs measurement reporting.

For the network device 500 according to the embodiment of this application, please refer to the flow corresponding to the method 200 according to the embodiment of this application. Furthermore, each unit/module of the network device 500 and the foregoing other operations and/or functions are used to respectively implement the corresponding flow of the method 200, the same or equivalent technical effect can be achieved, and will no longer be described herein for the purpose of brevity.

Figure 6:
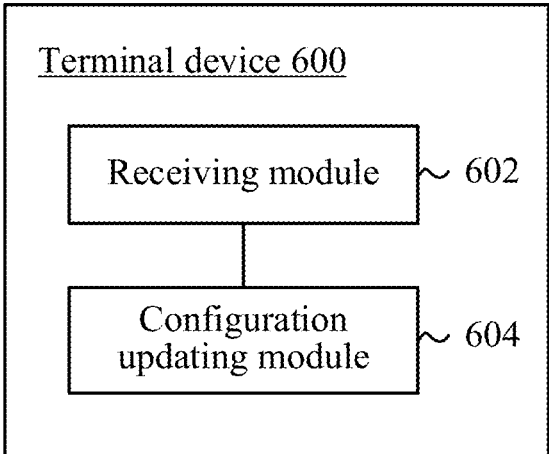
FIG. 6 is a schematic structural diagram of a terminal device according to another embodiment of this application.

FIG. 6 is a schematic structural diagram of a terminal device according to an embodiment of this application. As shown in FIG. 6, a terminal device 600 includes: a receiving module 602, which may be configured to receive a second message from a network device, where the second message includes reconfiguration information; and a configuration updating module 604, which may be configured to perform, based on the reconfiguration information, at least one of the following: configuration adding of a sidelink interface; configuration deleting of the sidelink interface; or reconfiguration of a Uu interface.

In one embodiment of this application, a network device to which a remote terminal belongs may send switching information, and the remote terminal performs switching according to the switching information, thereby completing the switching process to ensure service continuity and further improve system performance and user experience.

In one embodiment, the receiving module 602 may be configured to receive an access request message from the network device, where the request message is used to request a terminal device to access. The terminal device 600 may further include a sending module, which may be configured to send a response message, where the response message indicates that the terminal device is allowed to access.

The terminal device 600 may further include a sending module, which may be configured to establish, with a terminal device, an RRC connection of a PC5 interface and a bearer of the PC5 interface; and send a completion message of the second message to the network device.

The terminal device 600 may further include a sending module, which may be configured to release, with a terminal device, an RRC connection of a PC5 interface and a bearer of the PC5 interface; and send a completion message of the second message to the network device.

For the network device 600 according to the embodiment of this application, please refer to the flow corresponding to the method 300 according to the embodiment of this application. Furthermore, each unit/module of the network device 600 and the foregoing other operations and/or functions are used to respectively implement the corresponding flow of the method 300, the same or equivalent technical effect can be achieved, and will no longer be described herein for the purpose of brevity.

The embodiments in this specification are described in a progressive manner. Each embodiment usually focuses on a difference from other embodiments. For a same or similar part of the embodiments, refer to each other. A device embodiment is described simply because the device embodiment is similar to the method embodiment. For related details, please refer to some description of the method embodiment.

Figure 7:
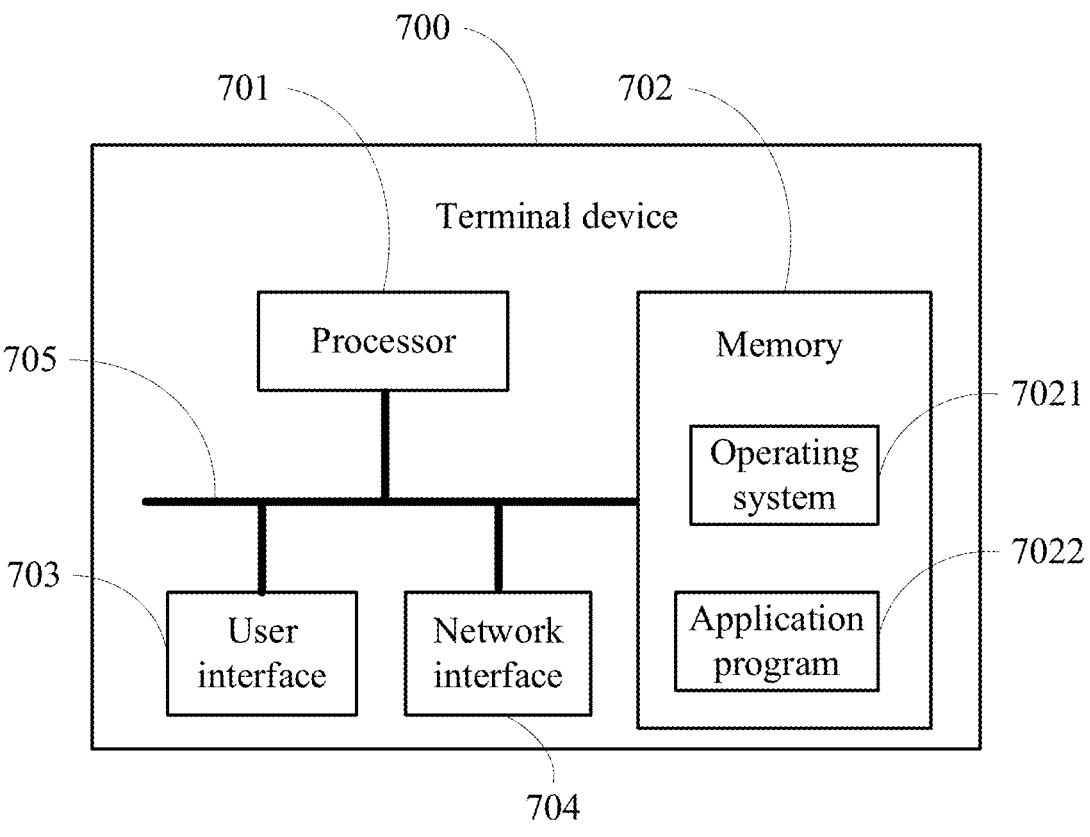
FIG. 7 is a schematic structural diagram of a terminal device according to still another embodiment of this application.

FIG. 7 is a block diagram of a terminal device according to another embodiment of this application. As shown in FIG. 7, a terminal device 700 includes: at least one processor 701, a memory 702, at least one network interface 704, and a user interface 703. All components in the terminal device 700 are coupled together through a bus system 705. It can be understood that the bus system 705 is configured to implement connection and communication between these components. In addition to a data bus, the bus system 705 further includes a power bus, a control bus, and a status signal bus. However, for clear description, various buses are marked as the bus system 705 in FIG. 7.

The user interface 703 may include a display, a keyboard, a clicking device (for example, a mouse, a trackball), a touch panel, or a touchscreen.

It can be understood that the memory 702 in this embodiment of this application may be a volatile memory or a nonvolatile memory, or may include both a volatile memory and a nonvolatile memory. The non-volatile memory is a Read-Only Memory (ROM), a Programmable ROM (PROM), an Erasable PROM (EPROM), an Electrically EPROM (EEPROM) or a flash memory. The volatile memory may be a Random Access Memory (RAM), used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM), and a Direct Rambus RAM (DRRAM). The memory 702 in the system and the method that are described in the embodiments of this application is to include but is not limited to these memories and a memory of any other proper type.

In some implementation manners, the memory 702 stores the following element, an executable module or a data structure, or a subset thereof, or an extension set thereof: an operating system 7021 and an application program 7022.

The operating system 7021 includes various system programs, for example, a framework layer, a kernel library layer, and a driver layer, and is configured to implement various basic services and process hardware-based tasks. The application program 7022 includes various application programs, for example, a media player, and a browser, and is configured to implement various application services. A program for implementing the method according to this embodiment of this application may be included in the application program 7022.

In this embodiment of this application, the terminal device 700 further includes a computer program that is stored in the memory 702 and that can be run on the processor 701, and when the computer program is executed by the processor 701, the steps of the following method embodiment 100 and 300 are implemented.

The method disclosed the foregoing embodiments of this application may be performed by the processor 701, or may be implemented by the processor 701. The processor 701 may be an integrated circuit chip having a signal processing capability. During implementation, each step of the foregoing method may be completed by using an integrated logic circuit of hardware in the processor 701 or an instruction in a form of software. The processor 701 may be a general-purpose processor, a Digital Signal Processor (DSP), an Application Specific Integrated Circuit (ASIC), a Field Programmable Gate Array (FPGA) or other programmable logic devices, a discrete gate or a transistor logic device, and a discrete hardware assembly. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory, an electrically erasable programmable memory, a register, or the like. The computer-readable storage medium is located in the memory 702, and the processor 701 reads information from the memory 702 and completes the steps of the foregoing method in combination with its hardware. Specifically, the computer-readable storage medium stores a computer program, and when the computer program is executed by the processor 701, the steps of the foregoing method embodiment 100 and 300 are performed.

It can be understood that the embodiments described in the embodiments of this application may be implemented by hardware, software, firmware, middleware, microcode, or a combination thereof. For implementation with hardware, the processing unit may be implemented in one or more Application Specific Integrated Circuits (ASIC), a Digital Signal Processing (DSP), a DSP Device (DSPD), a Programmable Logic Device (PLD), a Field-Programmable Gate Arrays (FPGA), general processors, controllers, micro-controllers, microprocessors, and another electronic unit for implementing the functions of this application, or their combinations.

For implementation with software, the technologies in the embodiments of this application may be implemented through modules (for example, procedures or functions) that perform the functions in the embodiments of this application. A software code may be stored in the memory and executed by the processor. The memory may be implemented in the processor or outside the processor.

The terminal device 700 can implement each process implemented by the terminal device in the foregoing embodiments, and the same or equivalent technical effect can be achieved. To avoid repetition, details are not described herein again.

Figure 8:
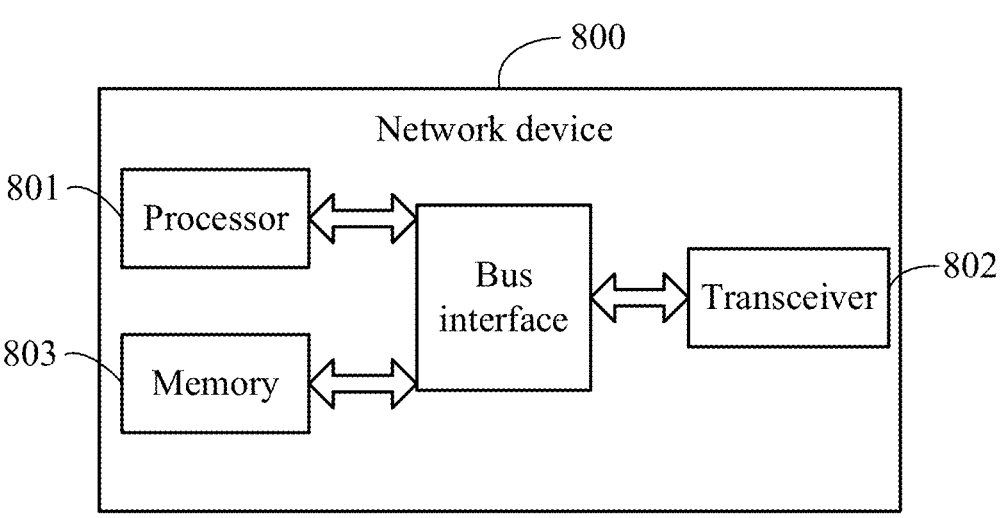
FIG. 8 is a schematic structural diagram of a network device according to another embodiment of this application.

Referring to FIG. 8, FIG. 8 is a structural diagram of a network device to which an embodiment of this application is applied, so that details of a method embodiment 200 may be implemented, and a same effect may be achieved. As shown in FIG. 8, a network device 800 includes a processor 801, a transceiver 802, a memory 803, and a bus interface.

In the embodiment of this application, the network device 800 further includes: a computer program stored in the memory 803 and capable of running on the processor 801. When the computer program is executed by the processor 801, the steps of the method embodiment 200 are implemented.

In FIG. 8, a bus architecture may include any quantity of interconnected buses and bridges, and is specifically linked by various circuits of one or more processors represented by the processor 801 and a memory represented by the memory 803. The bus architecture may further link various other circuits such as a peripheral device, a voltage regulator, and a power management circuit together. These are all well-known in the art, and therefore are not further described in this specification. The bus interface provides interfaces. The transceiver 802 may be a plurality of elements, in other words, includes a transmitter and a receiver, and provides a unit configured to communicate with various other apparatuses on a transmission medium.

The processor 801 is responsible for managing the bus architecture and common processing, and the memory 803 may store data used when the processor 801 performs an operation.

An embodiment of this application further provides a computer-readable storage medium. The computer-readable storage medium stores a computer program, and when a processor executes the computer program, the processes of the embodiments of the foregoing method embodiments 100, 200 and 300 are implemented and the same technical effects may be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the descriptions of the foregoing implementation manners, a person skilled in the art may clearly understand that the foregoing method embodiments may be implemented by software in addition to a necessary universal hardware platform or by hardware only. In most circumstances, the former is a preferred implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A switching method in a sidelink relay architecture, performed by a terminal device, comprising:
    receiving measurement configuration information, wherein the measurement configuration information is used to indicate that the terminal device measures link quality between the terminal device and a plurality of potential relay terminals;
    performing measurement reporting of a potential relay terminal according to the measurement configuration information, wherein the potential relay terminal being reported is a potential relay terminal among the plurality of potential relay terminals that establishes a binding relationship with the terminal device;
    receiving a first message from a network device, wherein the first message comprises switching information; and
    performing switching from a source link to a target link according to the switching information, wherein at least one of the source link or the target link is a relay link,
    wherein the switching method further comprises:
        deleting radio link control (RLC) entity configuration;
        deleting configuration that is of a medium access control (MAC) layer and is related to the source link; and
        stopping a timer that is of the MAC layer and is related to the source link.

2. The switching method according to claim 1, wherein the performing switching from a source link to a target link according to the switching information comprises:
    performing switching from a first relay link to a first Uu link according to the switching information;
    performing switching from a second Uu link to a second relay link according to the switching information; or
    performing switching from a third relay link to a fourth relay link according to the switching information,
        wherein the first relay link and the first Uu link are served by a same network node or are served by different network nodes;
        the second relay link and the second Uu link are served by a same network node or are served by different network nodes; and
        the third relay link and the fourth relay link are served by a same network node or are served by different network nodes.

3. The switching method according to claim 1, wherein after the performing switching from a source link to a target link, the method further comprises:
    sending a completion message for the first message.

4. The switching method according to claim 1, wherein the measurement configuration information is used to indicate that the terminal device further measures at least one of the following:

signal quality of a serving cell;

signal quality of a potential cell other than the serving cell; or link quality between the terminal device and a current serving relay terminal.

5. The switching method according to claim 4, wherein the performing measurement reporting according to the measurement configuration information comprises: performing reporting when at least one of the following conditions is met:

measurement result of the serving cell or the current serving relay terminal is higher than a first threshold;

measurement result of the serving cell or the current serving relay terminal is lower than a second threshold;

measurement result of the potential relay terminal is higher than the measurement result of the current serving relay terminal plus an offset;

measurement result of the potential cell or the potential relay terminal is higher than a third threshold;

measurement result of the serving cell is lower than a fourth threshold, and measurement result of the potential relay terminal is higher than a fifth threshold;

measurement result of the current serving relay terminal is lower than a sixth threshold, and measurement result of the potential relay terminal or the potential cell is higher than a seventh threshold;

measurement result of the potential cell across a radio access technology (RAT) or the potential relay terminal across the RAT is higher than an eighth threshold;

measurement result of the serving cell is lower than a ninth threshold, and measurement result of the potential relay terminal across the RAT is higher than a tenth threshold; or measurement result of the current serving relay terminal is lower than an eleventh threshold, and measurement result of the potential relay terminal across the RAT or the potential cell across the RAT is higher than a twelfth threshold.

6. The switching method according to claim 1, wherein before the performing measurement reporting according to the measurement configuration information, the method further comprises:

receiving a broadcast message from the potential relay terminal, wherein the broadcast message is used to indicate that the potential relay terminal supports providing a relay service;

sending a request message, wherein the request message is used to request a relay terminal that provides a relay service; or receiving a response message from the potential relay terminal, wherein the response message is used to indicate that the potential relay terminal supports providing a relay service.

7. The switching method according to claim 6, wherein the measuring the link quality between the terminal device and the potential relay terminal comprises: measuring the link quality between the terminal device and the potential relay terminal according to at least one of the following:

the broadcast message;

the request message;

the response message; or a reference signal from the potential relay terminal.

8. The switching method according to claim 1, wherein the method further comprises:

receiving packet data convergence protocol (PDCP) reconstruction indication information; and performing operations of security reset and header compression reset according to the PDCP reconstruction indication information.

9. The switching method according to claim 8, wherein when an acknowledged mode (AM) is configured with a status reporting function, the method further comprises:

sending a first status report; and retransmitting, according to the received second status report, a packet that is not successfully transmitted on the source link.

10. The switching method according to claim 1, wherein the method further comprises:

receiving packet data convergence protocol (PDCP) recovery indication information; and performing data recovery-related operations according to the PDCP recovery indication information.

11. A terminal device, comprising:

a memory storing a computer program; and a processor coupled to the memory and configured to execute the computer program to perform operations comprising:

receiving measurement configuration information, wherein the measurement configuration information is used to indicate that the terminal device measures link quality between the terminal device and a plurality of potential relay terminals;

performing measurement reporting of a potential relay terminal according to the measurement configuration information, wherein the potential relay terminal being reported is a potential relay terminal among the plurality of potential relay terminals that establishes a binding relationship with the terminal device;

receiving a first message from a network device, wherein the first message comprises switching information; and performing switching from a source link to a target link according to the switching information, wherein at least one of the source link or the target link is a relay link, wherein the operations further comprise:

deleting radio link control (RLC) entity configuration;

deleting configuration that is of a medium access control (MAC) layer and is related to the source link; and stopping a timer that is of the MAC layer and is related to the source link.

12. The terminal device according to claim 11, wherein the performing switching from a source link to a target link according to the switching information comprises:

performing switching from a first relay link to a first Uu link according to the switching information;

performing switching from a second Uu link to a second relay link according to the switching information; or performing switching from a third relay link to a fourth relay link according to the switching information, wherein the first relay link and the first Uu link are served by a same network node or are served by different network nodes;

the second relay link and the second Uu link are served by a same network node or are served by different network nodes; and the third relay link and the fourth relay link are served by a same network node or are served by different network nodes.

13. The terminal device according to claim 11, wherein the measurement configuration information is used to indicate that the terminal device further measures at least one of the following:

signal quality of a serving cell;

signal quality of a potential cell other than the serving cell; or link quality between the terminal device and a current serving relay terminal.

14. The terminal device according to claim 13, wherein the performing measurement reporting according to the measurement configuration information comprises: performing reporting when at least one of the following conditions is met:

measurement result of the serving cell or the current serving relay terminal is higher than a first threshold;

measurement result of the serving cell or the current serving relay terminal is lower than a second threshold;

measurement result of the potential relay terminal is higher than the measurement result of the current serving relay terminal plus an offset;

measurement result of the potential cell or the potential relay terminal is higher than a third threshold;

measurement result of the serving cell is lower than a fourth threshold, and measurement result of the potential relay terminal is higher than a fifth threshold;

measurement result of the current serving relay terminal is lower than a sixth threshold, and measurement result of the potential relay terminal or the potential cell is higher than a seventh threshold;

measurement result of the potential cell across a radio access technology (RAT) or the potential relay terminal across the RAT is higher than an eighth threshold;

measurement result of the serving cell is lower than a ninth threshold, and measurement result of the potential relay terminal across the RAT is higher than a tenth threshold; or measurement result of the current serving relay terminal is lower than an eleventh threshold, and measurement result of the potential relay terminal across the RAT or the potential cell across the RAT is higher than a twelfth threshold.

15. A switching method in a sidelink relay architecture, performed by a network device, comprising:

sending measurement configuration information, wherein the measurement configuration information is used to indicate that a terminal device measures link quality between the terminal device and a plurality of potential relay terminals and perform measurement reporting of a potential relay terminal according to the measurement configuration information, wherein the potential relay terminal being reported is a potential relay terminal among the plurality of potential relay terminals that establishes a binding relationship with the terminal device;

sending a first message, wherein the first message comprises switching information, and the switching information is used to indicate that the terminal device performs switching from a source link to a target link, wherein at least one of the source link and the target link is a relay link, wherein the switching information is further used to indicate that the terminal device performs:

deleting radio link control (RLC) entity configuration;

deleting configuration that is of a medium access control (MAC) layer and is related to the source link; and stopping a timer that is of the MAC layer and is related to the source link.

16. The method according to claim 15, further comprising:

sending a second message, wherein the second message comprises reconfiguration information, and the reconfiguration information is used to indicate that a relay terminal performs at least one of the following:

configuration adding of a sidelink interface;

configuration deleting of the sidelink interface; or reconfiguration of a Uu interface.

* * * * *